UNITED STATES PATENT OFFICE.

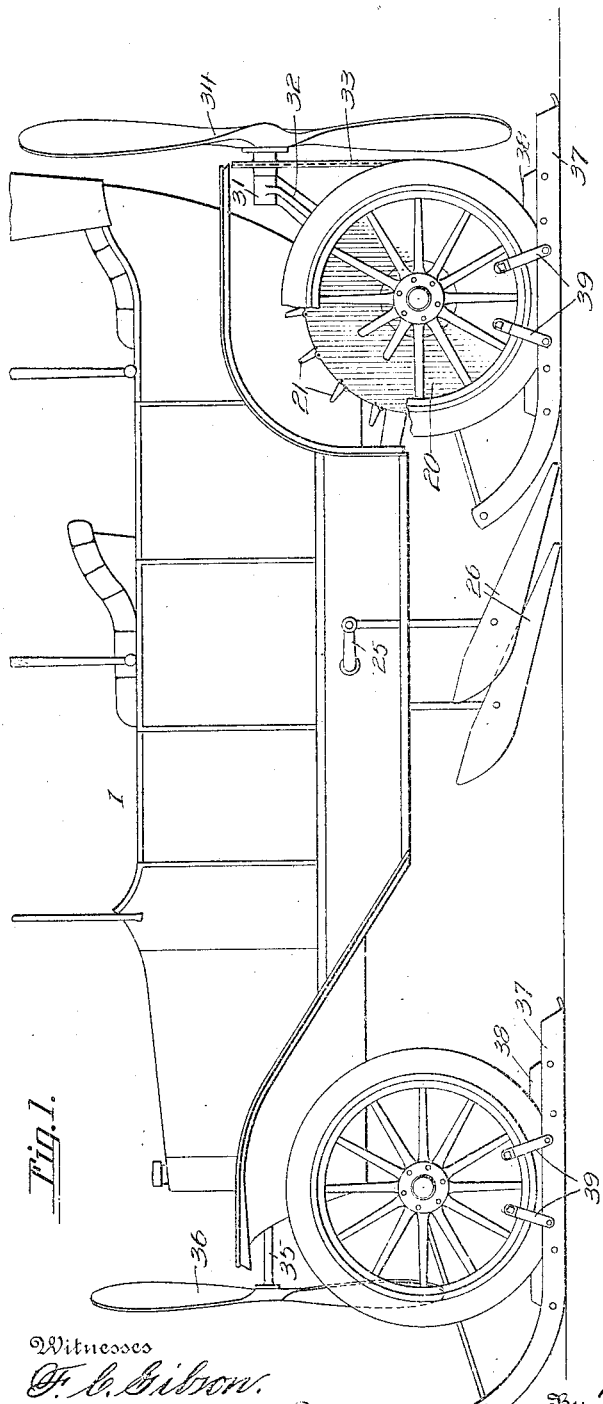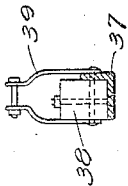

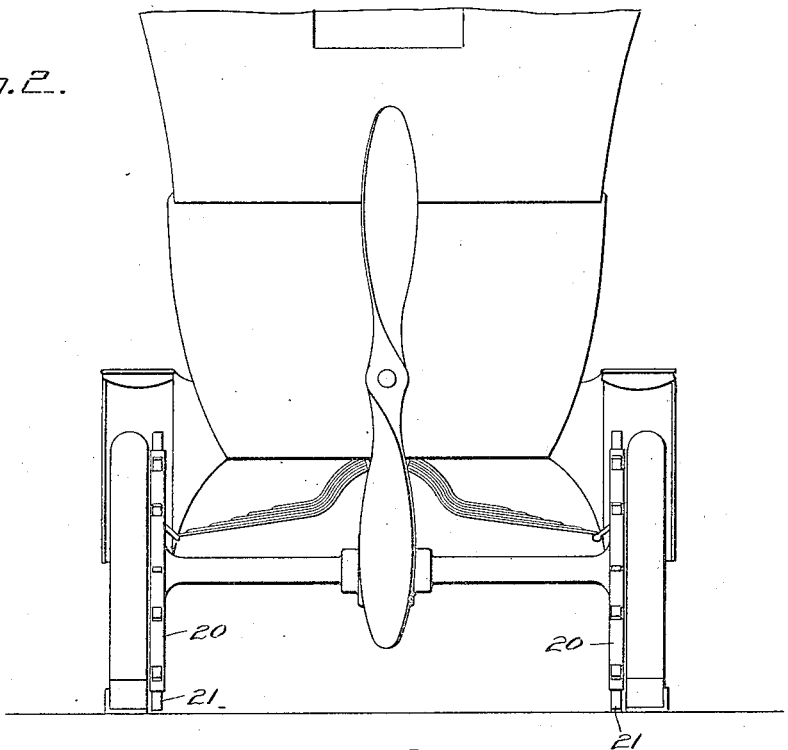
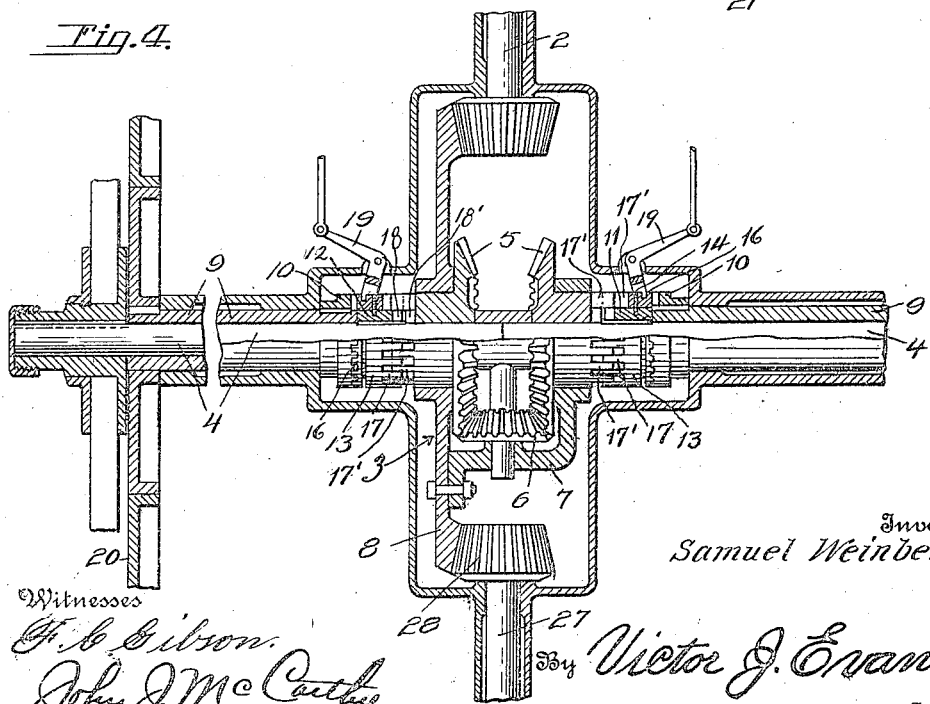

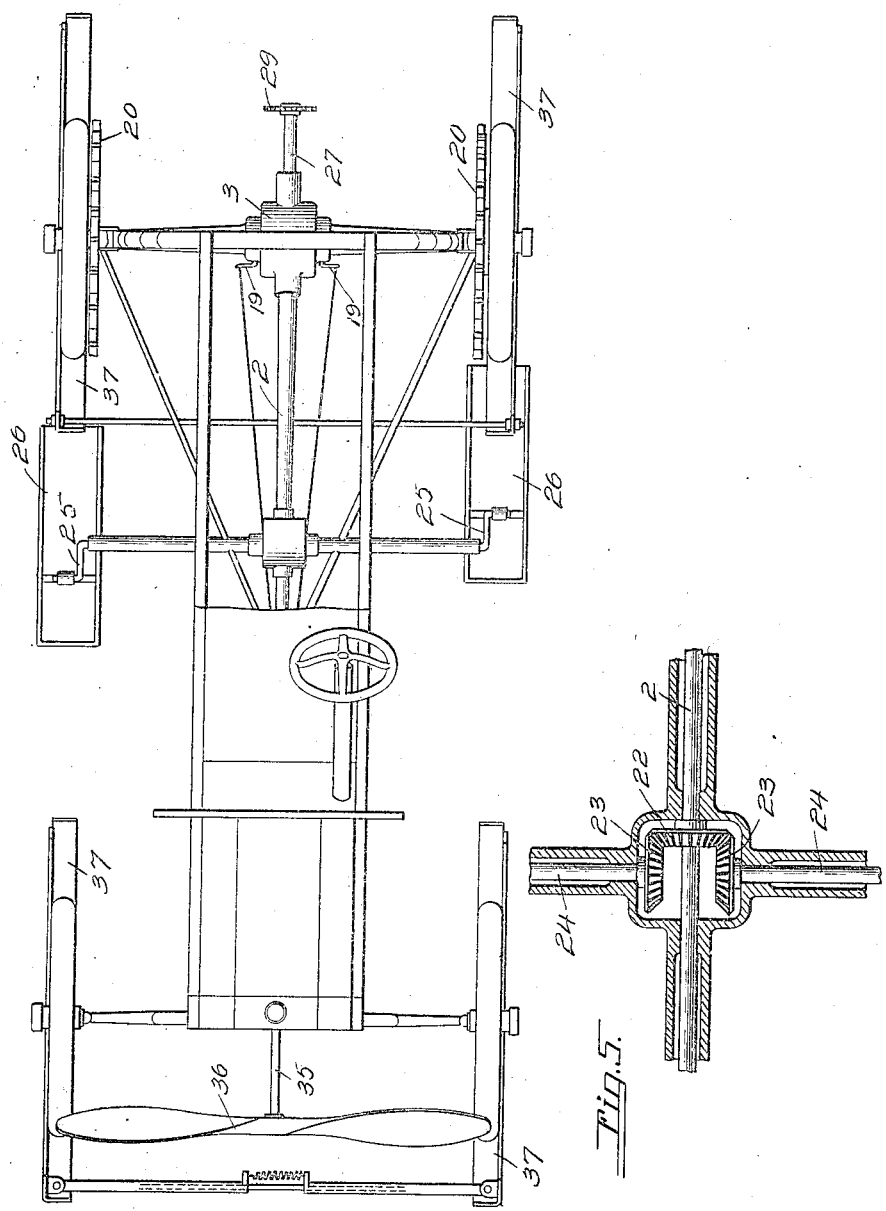

SAMUEL WEINBERG, OF REGAN, NORTH DAKOTA, ASSIGNOR OF ONE-HALF TO NATHAN WEINBERG, OF BOWDON, NORTH DAKOTA, AND ONE-HALF TO MORRIS WEINBERG, OF REGAN, NORTH DAKOTA.

SELF-PROPELLED SLEIGH.

1,213,715.   Specification of Letters Patent.   Patented Jan. 23, 1917.

Application filed July 14, 1916. Serial No. 109,321.

*To all whom it may concern:*

Be it known that I, SAMUEL WEINBERG, a citizen of the United States, residing at Regan, in the county of Burleigh and State of North Dakota, have invented new and useful Improvements in Self-Propelled Sleighs, of which the following is a specification.

This invention relates to certain novel and useful improvements in motor propelled sleighs and has particular application to mechanism for converting a wheeled motor vehicle into a sleigh.

In carrying out the present invention, it is my purpose to provide mechanism of the class described whereby a wheeled vehicle of the self-propelled type may be converted into a motor driven sleigh and wherein the power may be transmitted from the engine through the usual transmission and differential to spurred driving wheels, which latter may be connected to the engine and disconnected therefrom at will, and wherein the driving wheels of the vehicle will be automatically disconnected from the differential when the spurred wheels are connected thereto and vice versa.

It is also my purpose to provide a motor driven sleigh wherein the spurred wheels may be assisted by aerial propellers and steppers, thereby insuring positive driving of the sleigh.

Another object of my invention is to provide runners which may be readily attached to the front and rear wheels of the vehicle and removed therefrom.

With the above and other objects in view, the invention consists in the construction, combination and arrangement of parts hereinafter set forth in and falling within the scope of the claims.

In the accompanying drawings, Figure 1 is a view in side elevation of a motor driven sleigh constructed in accordance with the present invention. Fig. 2 is a rear elevation of the same. Fig. 3 is a top plan view of the chassis of the sleigh. Fig. 4 is an enlarged sectional view through the differential. Fig. 5 is an enlarged sectional view through the driving mechanism for the steppers. Fig. 6 is a view in side elevation of one of the runners. Fig. 7 is a cross sectional view on the line 7—7 of Fig. 6.

Referring now to the drawings in detail, 1 designates a wheeled motor vehicle of any well known or preferred type including a drive shaft 2 having one end connected to the engine shaft and the other end connected to the differential 3 mounted upon the rear axle 4. This differential 3 includes the usual bevel gears 5 loosely mounted upon the respective sections of the rear axle and connected to each other through the medium of a bevel pinion 6 carried by a cage 7 fastened to the ring gear 8 that is loosely mounted upon the hub of one of the bevel gears 5 and meshes with the pinion on the rear end of the drive shaft 2, as clearly illustrated in Fig. 4 of the drawings. Loosely surrounding the respective sections of the rear axle, as clearly illustrated in Fig. 4 of the drawings, are sleeves 9 arranged within the rear axle housing and fixed upon the inner ends of the respective sleeves 9 are clutch members 10. Splined upon the sections of the rear axle between the inner ends of the sleeves 9 and the outer ends of the hubs of the bevel gears 5 are clutches 11, each embodying an inner annulus 12 and an outer annulus 13 rotatably mounted upon the inner annulus and equipped with an inwardly extending pin 14 working in a groove 15 formed in the annulus 12. The outer edge of each annulus 13 is formed with clutch teeth 16 adapted to engage the teeth of the corresponding clutch member 10, while the inner end of each annulus 13 is formed with inwardly extending clutch fingers 17 which at all times engage in clutch teeth 17' formed on the corresponding bevel gear hub. On the inner end of each annulus 12 are formed clutch teeth 18 adapted to engage with teeth 18' formed on the hub of the corresponding bevel gear and arranged inwardly of the teeth coöperating with the fingers 17. The clutches 11 are under the control of bell crank levers 19 pivoted in slots in the rear axle housing and having the inwardly extending lugs connected to the respective clutches and the outwardly extending legs connected through suitable mechanism with a pedal within convenient reach of the foot of the driver of the vehicle.

Fixed upon the outer ends of the sleeves 9 are wheels 20 respectively arranged upon the inner sides of the respective drive wheels of the vehicle. Each wheel 20 is equipped with radially extending spurs 21 and these spurs may be mounted for inward and outward sliding movement and controlled by suitable mechanism so that the spurs may be projected beyond the peripheries of the wheels 20 when it is desired to use the vehicle as a sleigh and drawn inwardly of the peripheries of the respective wheels 20 when the vehicle is used in its ordinary capacity.

Fixed upon the drive shaft 2 is a bevel gear 22 meshing with pinions 23 fixed upon the inner ends of axially alining shafts 24 projecting from the opposite sides of the vehicle. Fixed upon the outer ends of the shafts 24 are crank arms 25 and connected to the crank arms 25 are depending stepper shoes 26. Journaled in a bearing carried by the rear portion of the differential housing is a horizontal shaft 27 having the inner end equipped with a pinion 28 meshing with the ring gear 8 and the outer end provided with a sprocket wheel 29 over which and a sprocket wheel 30 fixed upon a shaft 31 carried by a bracket 32 projecting upwardly from the rear axle housing is trained an endless chain 33. Fixed upon the outer end of the shaft 30 is a propeller 34.

35 designates a shaft arranged at the front end of the vehicle and having the inner end connected to the engine shaft and the outer end equipped with a propeller 36.

37 designates a runner preferably formed of angle irons and bolted or otherwise connected to the upper side of the flat portion of the runner 37 is a saddle 38 curved to conform to the curvature of the wheels of the vehicle. The saddle 38 is equipped with suitable clamps 39 whereby the runner may be attached to and detached from the wheel.

In practice, each wheel of the motor vehicle is equipped with one of the runners 37, as illustrated in Figs. 1 and 2 of the drawings. Normally, the annuli 12 are in engagement with the bevel gears 5 and the annuli 13 out of engagement with the clutch members 10, but when the runners are applied to the wheels, the levers 19 are operated to slide the clutches 11, thereby disconnecting the annuli 12 from the bevel gears 5 and connecting such gears with the sleeves 10 through the medium of the fingers 17, the latter remaining in engagement with the hubs of the bevel gears 5 in this shifting of the clutches, the annuli 13, the teeth 16 and the clutch members on the sleeves 9. Thus, in the operation of the engine, motion may be transmitted to the spurred wheels 20 so that the spurs 21 will bite into the snow to propel the sleigh. Simultaneously with the operation of the spurred wheels 20, the shafts 24 are rotated to operate the steppers 26 and the propellers 34 and 36 are also actuated to assist in propelling the sleigh.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:

1. In a motor driven sleigh, the combination with a wheeled vehicle, of runners detachably connected to the wheels of said vehicle, spurred wheels rotatable about the rear axle of the vehicle and adapted to bite into the snow to propel the sleigh, and means for connecting said spurred wheels to the ring gear of the differential and disconnecting the driving wheels from such ring gear.

2. In a motor driven sleigh, the combination with a wheeled vehicle, of runners detachably connected to the wheels of said vehicle, spurred wheels rotatable about the rear axle of the vehicle and adapted to bite into the snow to propel the sleigh, means for connecting said spurred wheels to the ring gear of the differential and disconnecting the driving wheels from such ring gear, and aerial propellers connected to the engine and ring gear respectively for assisting said spurred wheels in driving the sleigh.

3. In a motor driven sleigh, the combination with a wheeled vehicle, of runners detachably connected to the wheels of said vehicle, spurred wheels rotatable about the rear axle of the vehicle and adapted to bite into the snow to propel the sleigh, means for connecting said spurred wheels to the ring gear of the differential and disconnecting the driving wheels from such ring gear, aerial propellers connected to the engine and ring gear respectively for assisting said spurred wheels in driving the sleigh, and steppers connected to the driving shaft of the sleigh to augment the action of said propellers and spurred wheels.

4. In a motor driven sleigh, the combination with a wheeled vehicle, of runners detachably connected to the wheels of said vehicle, spurred wheels rotatable about the rear axle of the vehicle and adapted to bite into the snow to propel the sleigh, and manually controlled clutches for connecting said spurred wheels to the ring gear of the differential and disconnecting the drive wheels of the vehicle from such ring gear.

In testimony whereof I affix my signature.

SAMUEL WEINBERG.